United States Patent
Yamazaki et al.

(10) Patent No.: US 10,322,711 B2
(45) Date of Patent: Jun. 18, 2019

(54) LOW-VOLTAGE BATTERY CHARGING SPLIT OF HYBRID VEHICLES WITH BELT INTEGRATED STARTER-GENERATORS

(71) Applicant: Ford Global Technologies, LLC, Dearborn, MI (US)

(72) Inventors: Mark Steven Yamazaki, Canton, MI (US); Christopher Alan Lear, Dearborn, MI (US); Scott James Thompson, Canton, MI (US); Rajit Johri, Canton, MI (US); Fazal Urrahman Syed, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 340 days.

(21) Appl. No.: 15/285,008

(22) Filed: Oct. 4, 2016

(65) Prior Publication Data

US 2018/0093656 A1 Apr. 5, 2018

(51) Int. Cl.
| | | |
|---|---|---|
| *B60W 20/13* | (2016.01) | |
| *B60W 10/06* | (2006.01) | |
| *B60W 10/08* | (2006.01) | |
| *B60W 10/02* | (2006.01) | |
| *B60W 10/26* | (2006.01) | |
| *B60L 11/04* | (2006.01) | |

(Continued)

(52) U.S. Cl.
CPC ............ *B60W 20/13* (2016.01); *B60L 1/003* (2013.01); *B60L 1/20* (2013.01); *B60L 50/16* (2019.02); *B60L 58/12* (2019.02); *B60L 58/20* (2019.02); *B60W 10/02* (2013.01); *B60W 10/06* (2013.01); *B60W 10/08* (2013.01); *B60W 10/26* (2013.01); *B60K 6/387* (2013.01); *B60K 6/46* (2013.01); *B60L 2210/12* (2013.01); *B60L 2210/14* (2013.01); *B60L 2240/423* (2013.01); *B60L 2240/441* (2013.01); *B60L 2240/507* (2013.01); *B60Y 2200/92* (2013.01); *B60Y 2300/18183* (2013.01); *B60Y 2300/42* (2013.01); *B60Y 2300/91* (2013.01); *Y02T 10/642* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7233* (2013.01); *Y10S 903/93* (2013.01)

(58) Field of Classification Search
CPC ..... F16D 13/683; F16D 13/52; F16D 2300/12
See application file for complete search history.

(56) References Cited

U.S. PATENT DOCUMENTS

| | | | | |
|---|---|---|---|---|
| 2010/0117594 A1* | 5/2010 | Bissontz | ................... | B60K 6/48 320/104 |
| 2012/0187919 A1* | 7/2012 | Andersson | ............... | B60K 6/46 320/138 |

(Continued)

*Primary Examiner* — Anne M Antonucci
(74) *Attorney, Agent, or Firm* — David B. Kelley; Brooks Kushman P.C.

(57) ABSTRACT

A vehicle includes an electric machine, a starter-generator, and a controller. The electric machine is coupled to a traction battery via an inverter. The starter-generator is mechanically coupled with an engine and electrically coupled with a low-voltage battery. And, the controller charges the low-voltage battery with power from the traction battery, and in response to a torque demand of the electric machine falling below a threshold defined by losses of the inverter, transitions to the starter-generator to charge the low-voltage battery.

16 Claims, 5 Drawing Sheets

(51) Int. Cl.
*B60L 11/18* (2006.01)
*B60L 1/00* (2006.01)
*B60L 50/16* (2019.01)
*B60L 58/12* (2019.01)
*B60L 58/20* (2019.01)
B60K 6/387 (2007.10)
B60K 6/46 (2007.10)

(56) References Cited

U.S. PATENT DOCUMENTS

2015/0149014 A1  5/2015  Kees et al.
2015/0226171 A1  8/2015  Kees et al.
2017/0259803 A1* 9/2017  Khafagy ............... B60W 20/13

* cited by examiner

LOW-VOLTAGE BATTERY CHARGING SPLIT OF HYBRID VEHICLES WITH BELT INTEGRATED STARTER-GENERATORS

TECHNICAL FIELD

The present disclosure relates to control systems for hybrid vehicles including belt integrated starter/generators.

BACKGROUND

Vehicles commonly employ variable ratio transmissions to transfer power between an internal combustion engine and the vehicle wheels. In an automatic transmission, a controller selects the transmission ratio in response to the vehicle speed and a driver demand, usually communicated by depressing an accelerator pedal. In certain architectures, the vehicle also has a traction motor connected at the input of the transmission. The traction motor is electrically connected to a traction battery, typically a high-voltage battery having a terminal voltage greater than 100V. The motor can be used in either a motoring mode in which energy from the battery is used to supplement the engine power or in a generating mode in which the motor converts mechanical energy into electrical energy which is stored in the battery. Some vehicles also include a starter/generator, such as a belt integrated starter/generator (BISG) electrically connected to an auxiliary battery, typically a low-voltage battery having a terminal voltage less than 100V (e.g., 12V or 48V). A vehicle with a BISG may supply a charge to the low-voltage battery by either the BISG or the traction motor/traction battery.

SUMMARY

A vehicle includes an electric machine coupled to a traction battery via an inverter, a starter-generator mechanically coupled with an engine and electrically coupled with a low-voltage battery, and a controller. The controller charges the low-voltage battery with power from the traction battery, and in response to a torque demand of the electric machine falling below a threshold defined by losses of the inverter, transitions to the starter-generator to charge the low-voltage battery.

A vehicle controller includes input channels that receive signals indicative of a torque demand of an electric machine, output channels that provide commands to transition charging a low-voltage battery from an inverter of the electric machine to a starter-generator of an engine, and control logic that, in response to the torque demand falling below a threshold defined by losses of the inverter, generates the commands.

A method of controlling a vehicle powertrain includes, while an engine disconnect clutch coupling an engine to an electric machine is closed, and an SOC of a traction battery is less than a predefined value, charging a low-voltage battery with power from the electric machine. The method also includes, in response to a torque demand of the electric machine falling below a threshold, charging the low-voltage battery with power from a starter-generator of the engine.

DETAILED DESCRIPTION

Figure 1A:
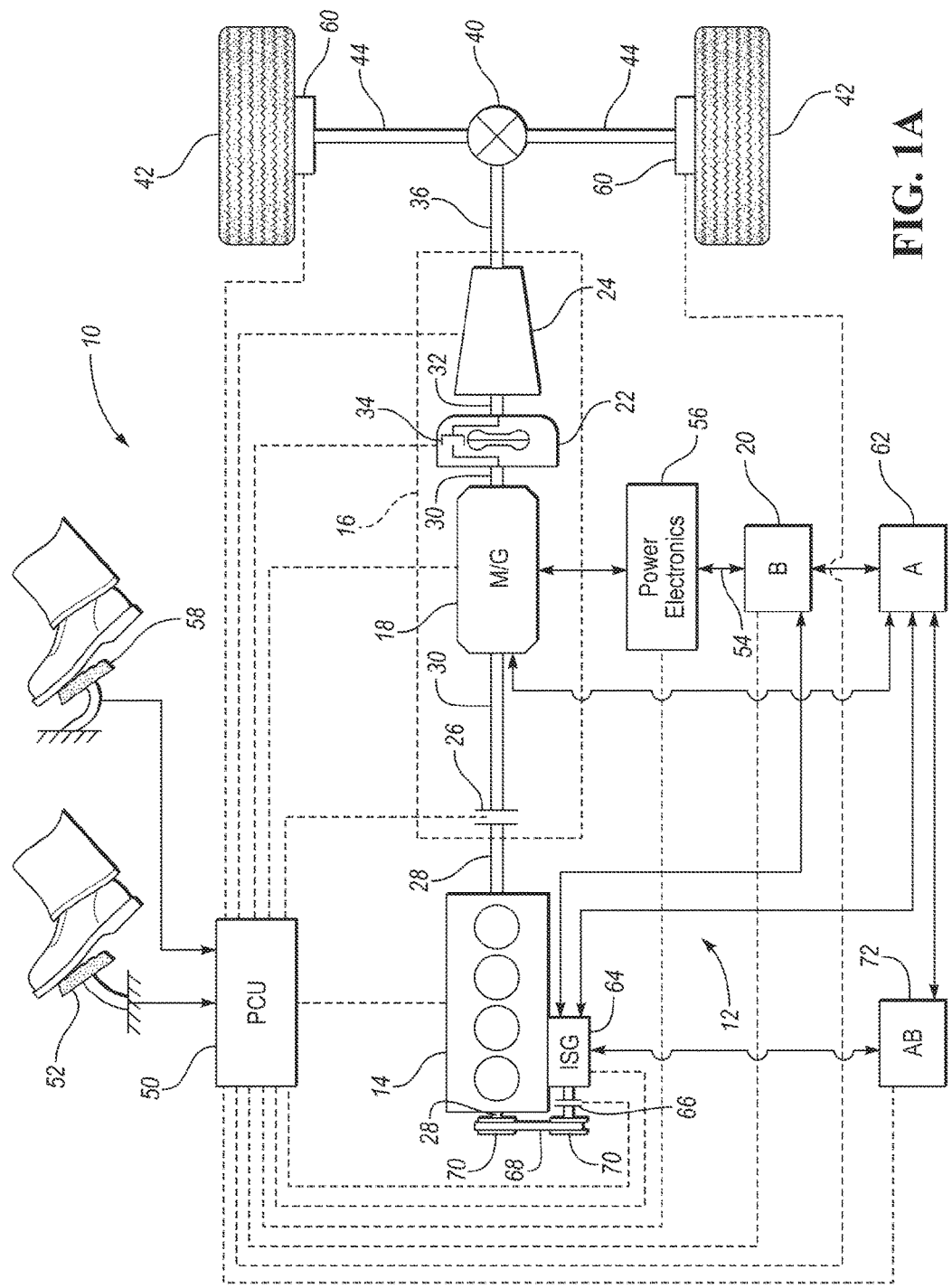
FIG. 1A is a block diagram of a powertrain of a hybrid electric vehicle having a belt integrated starter generator (BISG).

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A vehicle that includes an Integrated Starter Generator (ISG) fitted to a certain powertrain, typically has two sets of electric machines (including actuators to engage the electric machines) that may be configured to charge or discharge the low voltage battery. The low voltage battery can be charged directly by the ISG using engine power, or it could be charged by the high voltage battery via the DC/DC converter. A high voltage battery is a battery with a terminal voltage greater than 100 volts DC. When considering the path starting from fuel and ending with charge in the low voltage battery, there are different mechanical and electrical efficiencies to consider when determining the best path to charge the low voltage battery. Here, a system and method of determining and controlling charging the low voltage battery to maintain a low voltage battery state of charge (SOC) via the ISG, etc. are presented. The method selects the most efficient electrical path given current vehicle conditions, and commands the actuators in order to achieve the desired efficiency. The system is first optimized without taking into account the charging demand of the low voltage battery. The charging demand of the low voltage battery is then added, and two additional optimizations are performed, one using ISG to charge, and the other using the DC/DC converter to charge. The torque required to charge the low voltage battery is then split between the ISG and DC/DC such that optimal system efficiency is achieved. In this application, the term BISG also includes an integrated starter/generator (ISG) that is coupled with an internal combustion engine (also referred to as an engine) via a shaft, gear, or other mechanical structure.

Some systems only consider the SOC demand of the high voltage battery, and adjust powertrain actuators to meet the charging requirements of the high voltage battery. The charging of the low voltage battery is treated as a passive load on the high voltage system. With the addition of another potential path to charge, here, a controller considers the demands of the low voltage subsystem and adjusts powertrain actuators to achieve charging for overall system efficiency.

FIG. 1A is a block diagram of a powertrain of a hybrid electric vehicle having a belt integrated starter generator (BISG). Referring to FIG. 1A, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16. As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential 40 transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller"

that controls various actuators in response to signals from various sensors to control functions such as starting/stopping engine 14, operating the M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), FLASH memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VS S), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode. The power electronics 56 may include solid state electrical components and electro-mechanical components. The solid state electrical components may include insulated gate bipolar junction transistors (IGBTs), metal oxide semiconductor field effect transistor (MOSFETs), bipolar junction transistors (BJTs) and other components. In general, both solid state components and electro-mechanical components have losses; the losses include static and dynamic losses. For example many of the solid state components also referred to as devices may be operated in a linear region or a saturated region. When the device is operated in the saturation region, the power channel is limited by physical constraints of the device and package such as Resistance between drain and source ($Rds_{(on)}$) or a saturation voltage across the collector and emitter $Vce_{(sat)}$). In general a solid state device is most efficient when operated in the saturation region, however when turning on a solid state device, the device must transition through the linear region before reaching saturation. When the device is operated in the linear region, the power channel is limited by either a charge on a gate, a current flowing into a base, or another similar mechanism. Therefore losses during the transition or switching losses occur as these devices are modulated. In general the inverter and DC/DC converter modulates the solid state components to convert the power from the electric machine to the power able to be stored in the traction battery and vice versa.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20. Further, based on the materials, design, shape, rotational speed, and operational conditions of the M/G 18, the M/G 18 has operating areas or conditions in which the M/G 18 is not efficient. These non-efficient areas of operation may also be referred to as losses at may be characterized or calibrated and stored in a table in a controller or control logic, or may be calculated real-time.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1A is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

Figure 1B:
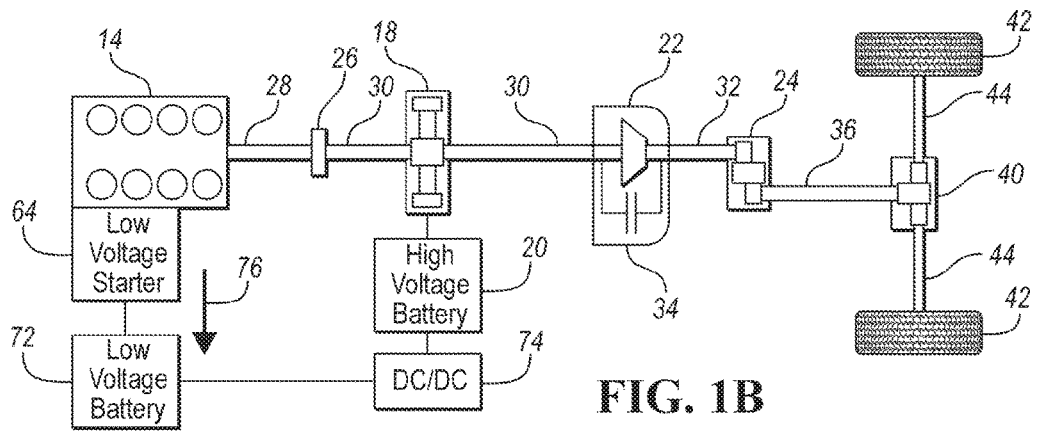
FIG. 1B is a block diagram of a powertrain of a hybrid electric vehicle charging a low voltage battery via a BISG.
Figure 1C:
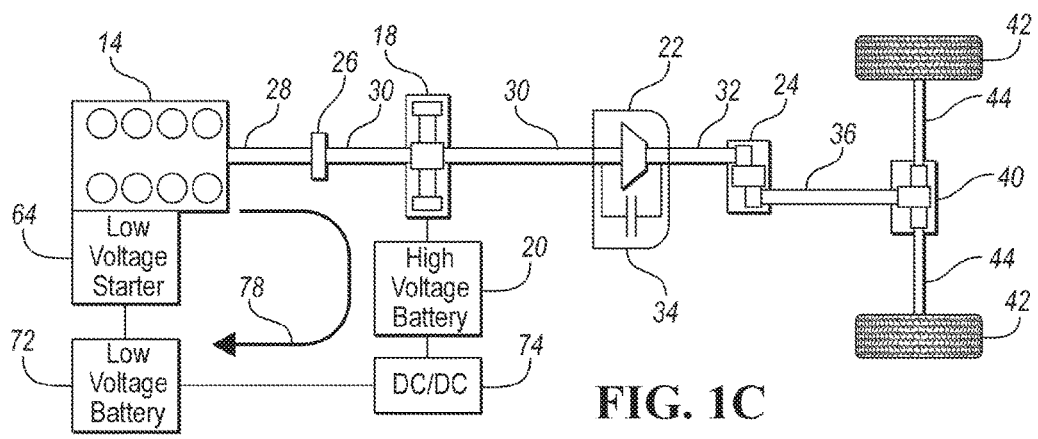
FIG. 1C is a block diagram of a powertrain of a hybrid electric vehicle charging a low voltage battery via a hybrid electric machine.

FIG. 1B is a block diagram of a powertrain of a hybrid electric vehicle charging a low voltage battery via a BISG. FIG. 1C is a block diagram of a powertrain of a hybrid electric vehicle charging a low voltage battery via a hybrid electric machine and/or traction battery. As shown in FIGS. 1B and 1C, charging the low voltage battery can be accomplished via the BISG or the DC/DC converter. In FIG. 1B charge 76 flows from the BISG 64 to the low voltage battery 72. The charge 76 may flow when the disconnect clutch 26 is disengage. At first glance, it would appear to be simpler to charge the battery using only the BISG while the engine is on and connected. That however may not be the case under all circumstances. In order to charge the battery with maximal system efficiency, the efficiencies of all actuators on both paths must be examined. A second path to charge a low voltage battery is shown in FIG. 1C, here, power 78 is transferred from the engine 14 to the electric machine 18 via the disconnect clutch 26. The power 78 (e.g., rotational energy, high-voltage energy, and low-voltage energy) is converted to electrical power in the electric machine 18 and stored in the high voltage battery 20. The power 78 may then be transferred from the high voltage battery 20 to the low-voltage battery 72 after being converted to low-voltage via a DC/DC converter 74. The power 78 is then stored in the low-voltage battery 72.

First, analyzing the case where the DC/DC converter only is used to charge the low voltage battery. For a given rotational speed of the engine ω and total torque demand $\tau_{Tot}$ from the engine and motor, the trade-off between the engine torque and motor torque can be done through the engine Brake Specific Fuel Consumption (BSFC) curve and motor efficiency map. This is a static optimization problem and can be formulated as:

$$\tau_{eng} + \tau_{mtr} = \tau_{Tot} \quad (1)$$

$$\tau_{Tot} = \tau_{dd} + \tau_{HV\_SOC} \quad (2)$$

$$\tau_{mtr1} = \mathrm{argmax}_{\tau_{mtr}}(\eta(\omega, \tau_{eng}, \tau_{mtr})) \quad (3)$$

$$\eta(\omega, \tau_{eng}, \tau_{mtr}) = \frac{\tau_{Tot} \cdot \omega + \tau_{mtr} \cdot \omega - P_{loss}(\tau_{mtr}, \omega)}{\dot{m} \cdot E_{lhv}} \quad (4)$$

In which:
$E_{lhv}$ is the lower heating value of the fuel,
m is the fuel flow rate,
$P_{loss}$ is the loss of the high voltage system,
$\tau_{Tot}$=driver demand torque $\tau_{dd}$ plus the torque for high voltage battery SOC $\tau_{HV\_SOC}$, and
$\tau_{mtr1}$ is the commanded value of motor torque for highest efficiency.

Now add the low voltage battery SOC demand to equations 1-4 and recalculate a second value of motor torque $\tau_{mtr2}$ which represents the additional demand required for low voltage SOC.

$$\tau_{eng} + \tau_{mtr} = \tau_{Tot2} \quad (5)$$

$$\tau_{Tot2} = \tau_{dd} + \tau_{HV\_SOC} + \tau_{LV\_SOC} \quad (6)$$

$$\tau_{mtr2} = \mathrm{argmax}_{\tau_{mtr}}(\eta(\omega, \tau_{eng}, \tau_{mtr})) \quad (7)$$

$$\eta(\omega, \tau_{eng}, \tau_{mtr}) = \frac{\tau_{Tot2} \cdot \omega + \tau_{mtr} \cdot \omega - P_{loss}(\tau_{mtr}, \omega)}{\dot{m} \cdot E_{lhv}} \quad (8)$$

And also consider the case where the BISG can also be used to charge the low voltage battery. The efficiency of the BISG charging path can be obtained by using the value of $\tau_{mtr1}$ obtained above, and using the BISG to honor the SOC request of the low voltage battery.

$$\tau_{eng} + \tau_{mot1} + \tau_{bisg} = \tau_{Tot2} \quad (9)$$

$$\tau_{bisg} = \mathrm{argmax}_{\tau_{bisg}}(\eta(\omega, \tau_{eng}, \tau_{bisg})) \quad (10)$$

$$\eta(\omega, \tau_{eng}, \tau_{bisg}) = \frac{(\tau_{Tot2} - \tau_{mtr1}) \cdot \omega + n\omega \cdot \tau_{bisg} - P_{loss}(\tau_{bisg}, n\omega) - P_{loss\_belt}(n\omega)}{\dot{m} \cdot E_{lhv}} \quad (11)$$

In which:
$P_{loss}(\tau_{bisg}, n\omega))$=electrical loss of BISG at engine speed× speed ratio, and
$P_{loss\_belt}(n\omega)$=belt loss of BISG at engine speed×speed ratio The equations 1-11 provide two maps of system efficiency for charging the low voltage battery with either the DC/DC path (e.g., traction battery and electric machine) illustrated as charge 76 or the BISG path illustrated as power 78. Several observations can be made of the vehicle with typical sizing of the engine, motor, BISG, and DC/DC converter. These are summarized as follows:

First, if the high voltage motor path is used to charge the low voltage battery, the overall system efficiency is higher when the motor power is above a nominal value. As will be described in FIG. 5.

Figure 4:
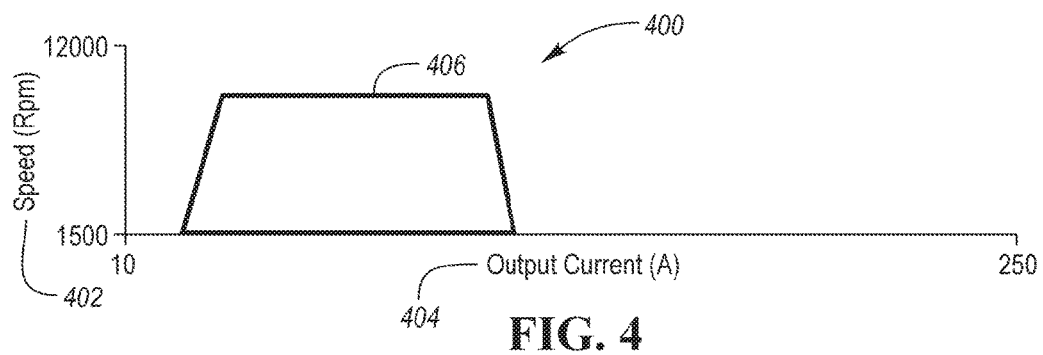
FIG. 4 is a graphical representation illustrating a high efficiency region of operation of a BISG with respect to speed and output current.

Second, if the BISG path is used, the overall system efficiency is higher when the BISG power is below a nominal value. As shown in FIG. 4.

Third, if the BISG path is used, the overall system efficiency is higher if the rotational speed of the BISG is below a nominal value. As will be described in FIG. 4.

Fourth, if SOC of the high voltage battery has been charged to a maximum range due to driver/road interaction, the HV SOC management strategy will want to shed excess charge. Using excess charge to provide additional power to the driveline will reduce overall system efficiency by moving the engine torque into a low efficiency range of the BSFC curve.

Figure 6:
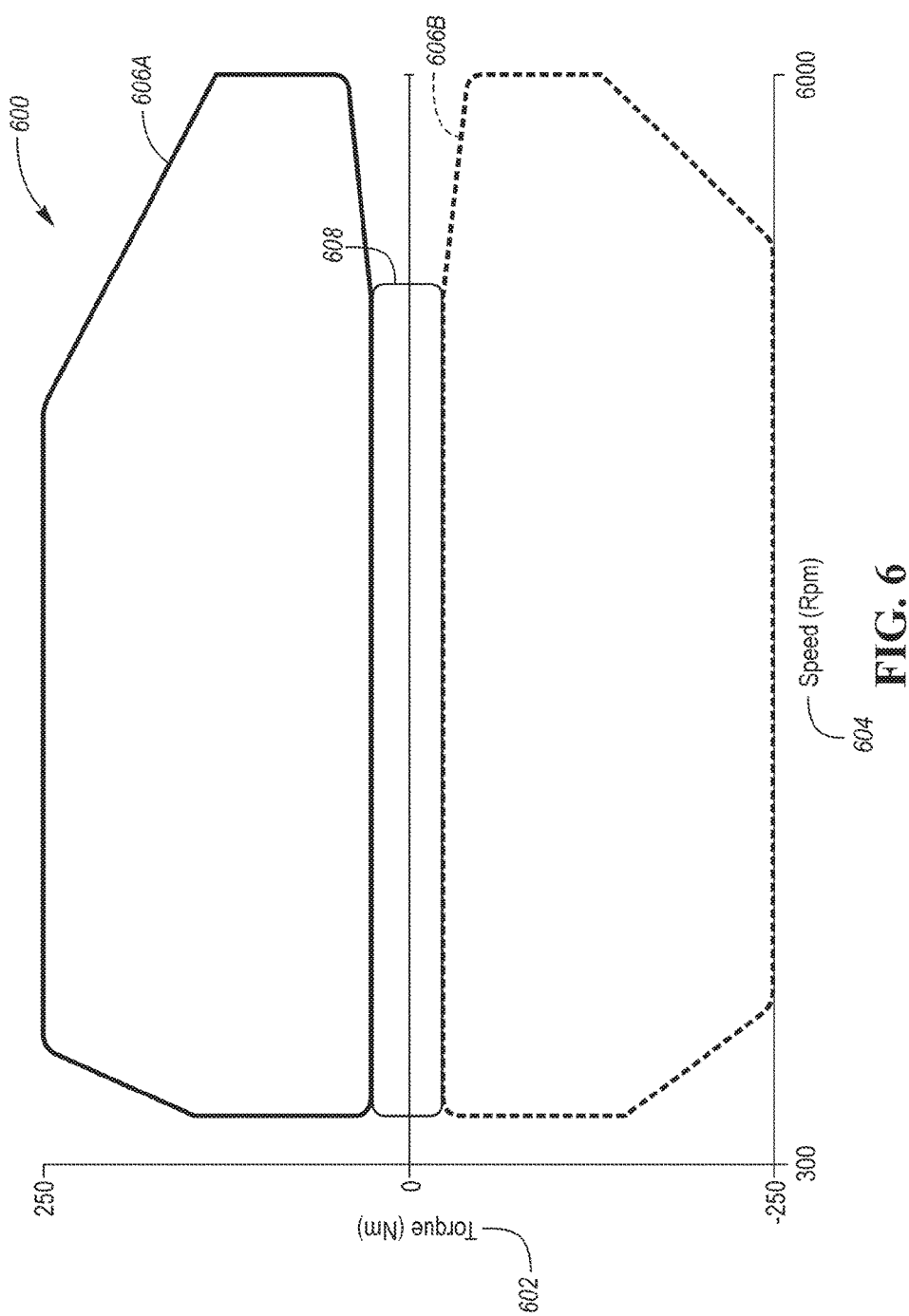
FIG. 6 is a graphical representation illustrating efficient areas of charging a low-voltage battery with a BISG and a DC/DC converter with respect to motor torque demand and speed.

With the above observations, it is possible to form a strategy. The strategy should allow for optimization as shown in the equations above, as well as allowing calibration to adjust for NVH and other customer perceived attributes. The following rules can form a guideline:

First, determine charging demand of low voltage battery PLVSOC=f (voltage, current, temp). If the disconnect clutch is open, charge with the BISG only, if the high voltage system needs to shed charge, use the DC/DC path to charge, and if HV SOC is in a normal range, charge the low voltage battery optimally as determined by the equations above. The optimization can be stored in tables as shown in FIG. 4 or FIG. 6. Then command the engine, high voltage motor, and BISG torque to the appropriate values to meet driver demand while also charging the battery.

Figure 2:
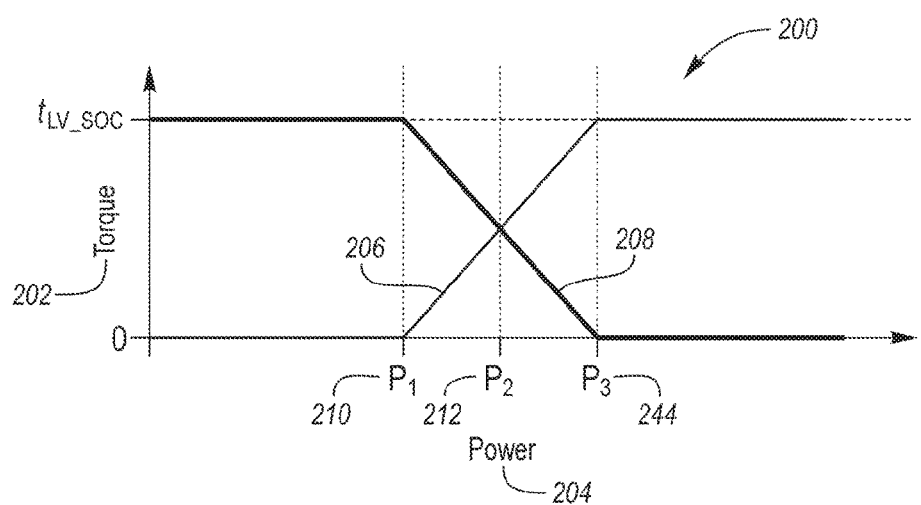
FIG. 2 is a graphical representation of motor torque in relation to power illustrating torque split of a BISG and a hybrid vehicle motor.

FIG. 2 is a graphical representation 200 of motor torque 202 in relation to power 204 illustrating a torque split of a BISG and a hybrid vehicle electric machine. An electric machine torque 206 is plotted with a BISG torque 208. This graphical representation 200 illustrates a function for determining an efficiency split between the BISG path and the DC/DC path for charging the low voltage battery. $\tau_{LV\_SOC}$ is the torque required at a current speed to achieve a desired charge power. From 0 to P1 210, the charging occurs solely via the BISG. From P1 210 to P3 244, charging is provided by both the BISG and DC/DC, where P2 212 indicates a transition point in which equal amounts of power are provided by both the BISG and electric machine. Past P3 244, charging is provided solely by the via the DC/DC path. In prototype vehicles, P2 212 occurs near 1.5 kW.

Figure 3:
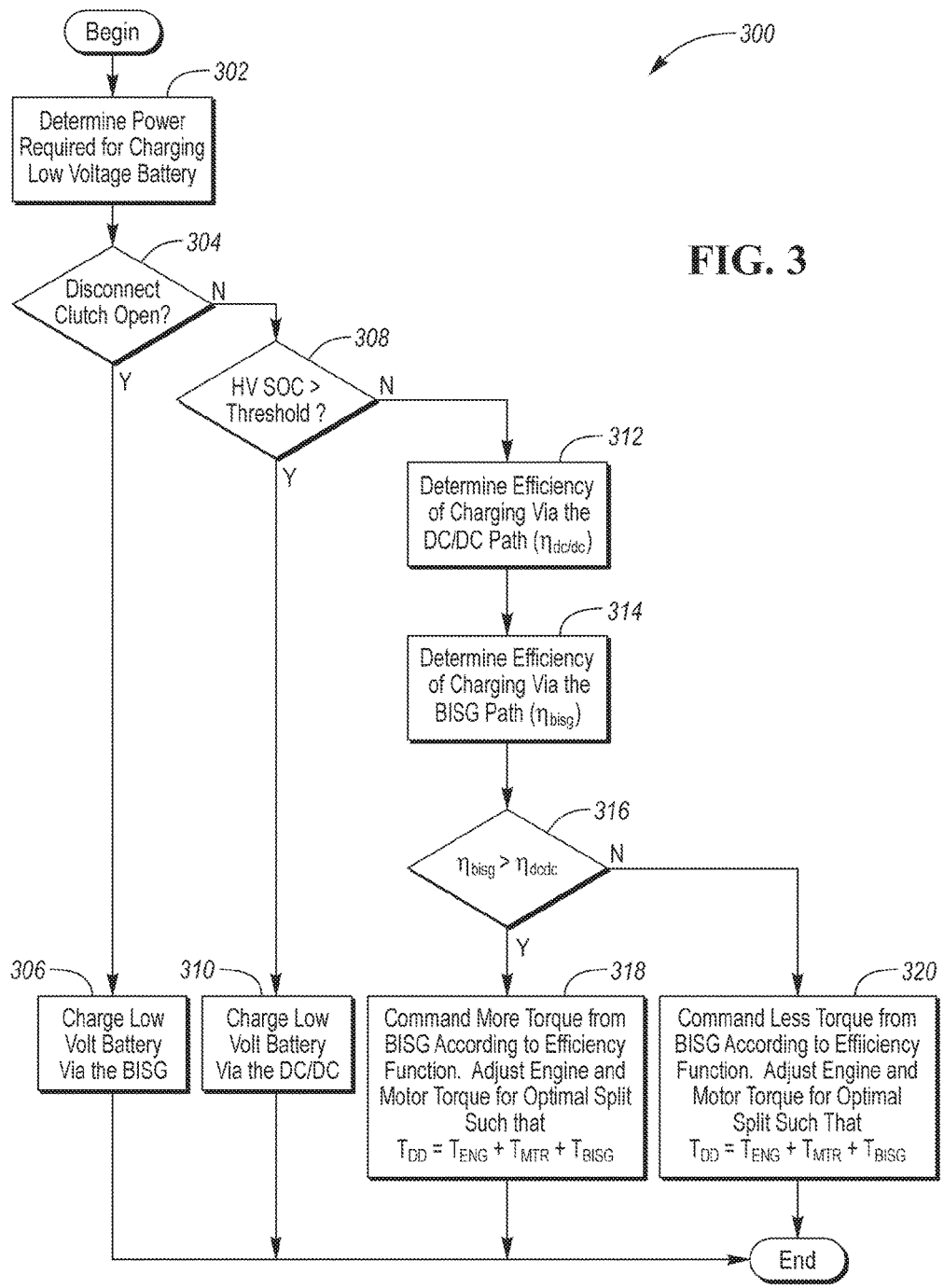
FIG. 3 is a control diagram illustrating a first method for controlling the BISG, engine and motor torque to charge a low-voltage battery.

FIG. 3 is a control diagram 300 illustrating a first method for controlling the BISG, engine, and motor torque to charge a low-voltage battery. In operation 302, a controller receives signals indicative of a condition of a hybrid vehicle. The conditions include a condition of a disconnect clutch between an engine and an electric machine (e.g., disconnect clutch 26), a condition of a traction battery (e.g., high voltage battery 20), a condition of a low voltage battery (e.g., low voltage battery 72), and a condition of other powertrain and vehicle systems.

In operation 304, the controller branches to operation 306 if the disconnect clutch is open. In operation 306, the controller configures the BISG to charge the low voltage battery. In operation 306 if the disconnect clutch is closed, the controller branches to operation 308.

In operation 308 the controller branches to operation 310 if a state of charge (SOC) of the high voltage battery is greater than a threshold. Here, the threshold is based on many factors including a vehicle weight, an operating mode of the vehicle, an electric machine configuration, and traction battery characteristics such as chemistry, size, and temperature. Based on the factors, a calibration table may be generated such that predefined values are stored and easily accessible during operation. In another embodiment, the factors may be calculated real-time, or a combination of both stored and real-time data. In operation 310, the controller configures the DC/DC converter to charge the low voltage battery by flowing a charge from at least one of an electric machine or a traction battery to the low voltage battery. In operation 308 if the SOC is less than the threshold, the controller branches to operation 312.

In operation 312, the controller determines the efficiency of charging the low voltage battery via the traction battery and electric machine via the DC/DC converter and proceeds to operation 314.

In operation 314, the controller determines the efficiency of charging the low voltage battery via the integrated starter/generator and proceeds to operation 316.

In operation 316 the controller branches to operation 318 if the efficiency of the integrated starter/generator is greater than the efficiency of the traction battery and electric machine via the DC/DC converter. If the efficiency of the integrated starter/generator is less than the efficiency of the traction battery and electric machine via the DC/DC converter, the controller branches to operation 320.

In operation 318, the controller configures the BISG to draw more torque according to the efficiency function and then adjusts engine and motor operation for the optimal split thereby increasing the charging of the low voltage battery from the BISG.

In operation 320, the controller configures the BISG to draw less torque according to the efficiency function and then adjusts engine and motor operation for the optimal split thereby decreasing the charging of the low voltage battery from the BISG.

FIG. 4 is a graphical representation 400 illustrating a high efficiency region 406 of operation of a BISG with respect to speed 402 and output current 404. This chart is a 2 dimensional representation of a 3 dimensional graph wherein the high efficiency region 406 defines an area at which the efficiency of the BISG is greater than a value (e.g., 80%). For example, at a speed of 2000 RPM with an output current of 100 Amps, the efficiency may be 83% thus being within the high efficiency region 406, while at the same speed of 2000 RPM with an output current of 10 Amps, the efficiency may be 65% thus being outside the high efficiency region 406.

Figure 5:
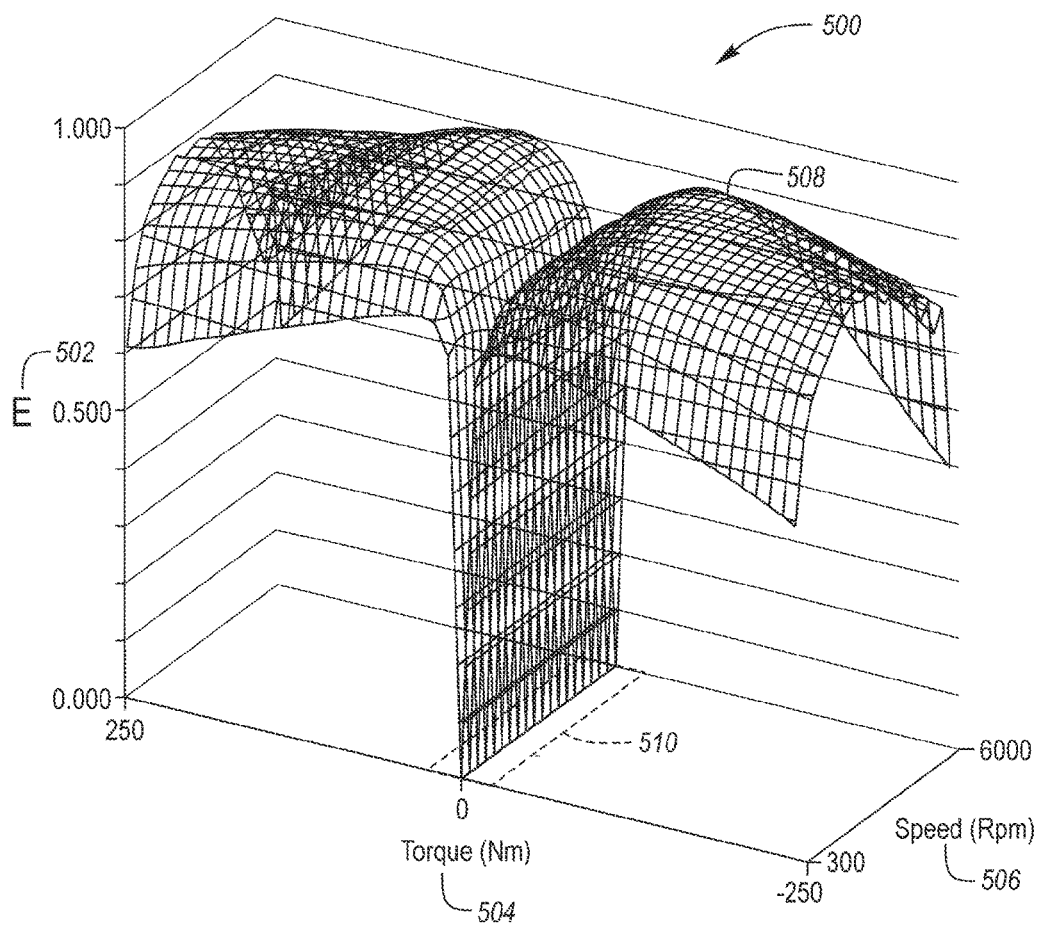
FIG. 5 is a graphical representation illustrating efficiency of a hybrid motor with respect to torque demand and speed.

FIG. 5 is a graphical representation 500 illustrating the efficiency 502 of a hybrid motor with respect to torque demand 504 and speed 506 of the motor. This contour is a result of the motor design and the loss of the power electronics in the inverter used to convert DC voltage to the AC signals to drive the motor. The torque demand 504 may also be referred to as a torque command as it is based on the operation of the inverter. The operation of the inverter includes the modulation of the power electronics, including IGBTs, Power MOSFETs, BJTs, or other solid state switches used to control the motor. The modulation includes the frequency and duty cycle of the modulation. As shown in the graphical representation, the efficiency drops to approximately 0 when there is no torque demand for the motor. Further, the efficiency of the motor and high voltage system to charge the low voltage battery is generally greater than that of the BISG at most operating points outside of a low efficiency region 510. The low efficiency region 510 is an area in which charging of the low voltage battery is better performed by the BISG. A controller or control logic may use the outline of the low efficiency region 510 as a transition point in which low-voltage battery charging operations switch from use of the motor and high voltage system to charge the low voltage battery to the BISG.

FIG. 6 is a graphical representation 600 illustrating efficiency areas with respect to motor torque demand 602 and motor speed 604. This chart is a 2 dimensional representation of a 3 dimensional graph wherein a DC/DC high efficiency region 606A and 606B is formed such that, at a specific motor torque demand 602 and motor speed 604 operating condition, the efficiency of charging the low voltage battery via the DC/DC converter and high voltage system is greater than a value (e.g., 80%). Also, a BISG high efficiency region 608 is formed such that, at a specific motor torque demand 602 and motor speed 604 operating condition, the efficiency of charging the low voltage battery via the BISG is greater than the value (e.g., 80%). Although this graphical representation was generated based on data of a specific vehicular system, in other embodiments, the concepts of this graph may still apply. For example, in a different embodiment, a DC/DC high efficiency region 606A and 606B may be formed such that, at a specific motor torque demand 602 and motor speed 604 operating condition, the efficiency of charging the low voltage battery via the DC/DC converter and high voltage system is greater than that of the BISG. And, a BISG high efficiency region 608 is formed such that, at a specific motor torque demand 602 and motor speed 604 operating condition, the efficiency of charging the low voltage battery via the BISG is greater than the DC/DC converter and high voltage system.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    an electric machine coupled to a traction battery via an inverter;
    a starter-generator mechanically coupled with an engine and electrically coupled with a low-voltage battery;
    a controller programmed to charge the low-voltage battery with power from the traction battery, and in response to a torque demand of the electric machine falling below a threshold defined by losses of the inverter, transition to the starter-generator to charge the low-voltage battery; and
    a disconnect clutch configured to couple the engine with the electric machine, wherein the controller is programmed to, in response to the engine obtaining a target speed, close the disconnect clutch.

2. The vehicle of claim 1 wherein the controller is further programmed to, while the disconnect clutch is open, charge the low-voltage battery with the starter-generator.

3. The vehicle of claim 2, wherein the controller is further programmed to, in response to a torque demand of the electric machine falling below the threshold while the disconnect clutch is closed, charge the low-voltage battery with the starter-generator.

4. The vehicle of claim 1, wherein the controller is further programmed to, while a state of charge of the traction battery is greater than a predefined value, charge the low-voltage battery with power from the electric machine.

5. The vehicle of claim 1, wherein the losses of the inverter are switching losses of the inverter and a DC/DC converter, coupled with the inverter, at the torque demand.

6. The vehicle of claim 1 further comprising a DC/DC converter coupled between the traction battery and the low-voltage battery, wherein the controller is further programmed to charge the low-voltage battery with power transformed by the DC/DC converter.

7. The vehicle of claim 1, wherein the starter-generator is selectively coupled to a crankshaft of the engine via a belt.

8. A vehicle controller comprising:
    input channels configured to receive signals indicative of a torque demand of an electric machine;
    output channels configured to provide commands to transition charging a low-voltage battery from an inverter of the electric machine to a starter-generator of an engine; and
    control logic programmed to, in response to the torque demand falling below a threshold defined by losses of the inverter, generate the commands, wherein the input channels are further configured to receive clutch signals indicative of a status of a disconnect clutch coupled between the engine and the electric machine, and wherein the control logic is further programmed to, while the clutch signals indicate an open status, generate commands to charge the low-voltage battery with the starter-generator.

9. The vehicle controller of claim 8, wherein the control logic is further programmed to, in response to a state of charge of the low-voltage battery being less than a predefined value, generate commands to charge the low-voltage battery with power from the electric machine.

10. The vehicle controller of claim 8, wherein the losses of the inverter are switching losses of the inverter and a DC/DC converter, coupled with the inverter, at the torque demand.

11. The vehicle controller of claim 8, wherein the control logic is further programmed to, in response to an SOC of a traction battery being greater than a predefined value, generate commands to charge the low-voltage battery with power from the traction battery.

12. The vehicle controller of claim 8, wherein the control logic is further programmed to, while the clutch signals indicate a closed status, and in response to a torque demand of the electric machine falling below the threshold, generate commands to charge the low-voltage battery with the starter-generator.

13. A method of controlling a vehicle powertrain comprising:
    while an engine disconnect clutch coupling an engine to an electric machine is closed, and an SOC of a traction battery is less than a predefined value, charging a low-voltage battery with power from the electric machine, and
    in response to a torque demand of the electric machine falling below a threshold, charging the low-voltage battery with power from a starter-generator of the engine.

14. The method of claim 13, further comprising, in response to a speed of the engine falling below a target speed, opening the engine disconnect clutch to disengage the engine from the electric machine, and charging the low-voltage battery with the starter-generator.

15. The method of claim 13, wherein the threshold is defined by losses of an inverter coupled between the electric machine and the traction battery.

16. The method of claim 15, wherein the losses are switching losses of the inverter and a DC/DC converter, coupled with the inverter, at the torque demand.

* * * * *